United States Patent
Joet (10) Patent No.: US 10,257,615 B2
(45) Date of Patent: Apr. 9, 2019

(54) MEMS AND/OR NEMS DYNAMIC PRESSURE SENSOR WITH IMPROVED PERFORMANCES AND MICROPHONE COMPRISING SUCH A SENSOR

(71) Applicant: Commissariat A L'Energie Atomique et aux Energies Alternatives, Paris (FR)

(72) Inventor: Loic Joet, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 171 days.

(21) Appl. No.: 15/072,495

(22) Filed: Mar. 17, 2016

(65) Prior Publication Data

US 2016/0277847 A1    Sep. 22, 2016

(30) Foreign Application Priority Data

Mar. 20, 2015  (FR) ...................................... 15 52340

(51) Int. Cl.
| | |
|---|---|
| *G01L 9/08* | (2006.01) |
| *H04R 19/04* | (2006.01) |
| *H04R 17/02* | (2006.01) |
| *H04R 7/04* | (2006.01) |
| *H04R 7/24* | (2006.01) |
| *H04R 19/00* | (2006.01) |

(52) U.S. Cl.
CPC ................ *H04R 19/04* (2013.01); *G01L 9/08* (2013.01); *H04R 7/04* (2013.01); *H04R 7/24* (2013.01); *H04R 17/02* (2013.01); *H04R 19/005* (2013.01); *H04R 2201/003* (2013.01)

(58) Field of Classification Search
None
See application file for complete search history.

(56) References Cited

U.S. PATENT DOCUMENTS

| 8,783,113 B2 | 7/2014 | Robert et al. |
| 9,157,821 B2 | 10/2015 | Robert et al. |
| 2011/0154905 A1* | 6/2011 | Hsu ........................ G01L 9/0073 73/724 |

(Continued)

FOREIGN PATENT DOCUMENTS

| FR | 2 983 844 A1 | 6/2013 |
| WO | WO 2010/087816 A1 | 8/2010 |

OTHER PUBLICATIONS

U.S. Appl. No. 14/720,282, filed May 22, 2015, Philippe Robert et al.

(Continued)

*Primary Examiner* — Andre J Allen
(74) *Attorney, Agent, or Firm* — Oblon, McClelland, Maier & Neustadt, L.L.P.

(57) ABSTRACT

Dynamic pressure sensor of MEMS and/or NEMS type comprising a support and a rigid sensitive element anchored to the support by at least one anchoring zone, said sensitive element comprising a parallel first and a second face intended to be subjected to different pressures, said sensitive element being capable of having an out-of-plane displacement with respect to the support in a detection direction under the effect of a pressure difference, the pressure sensor also comprising a detector of a force applied to the sensitive element by the pressure difference.

23 Claims, 8 Drawing Sheets

(56) References Cited

U.S. PATENT DOCUMENTS

| | | | |
|---|---|---|---|
| 2013/0000411 A1* | 1/2013 | Robert ................. | G01L 9/0052 |
| | | | 73/708 |
| 2013/0047746 A1* | 2/2013 | Nakamura ............ | G01L 9/0019 |
| | | | 73/862.59 |
| 2014/0247954 A1 | 9/2014 | Hall et al. | |
| 2018/0072560 A1* | 3/2018 | Grutzeck ............. | B81B 3/0037 |

OTHER PUBLICATIONS

U.S. Appl. No. 15/072,495, filed Mar. 17, 2016, Loic Joet.
French Preliminary Search Report dated Jan. 27, 2016 in French Application 15 52340, filed on Mar. 20, 2015.
Alfons Dehe "Silicon microphone development and application", Science Direct, Sensors and Actuators A 133, 2007, 5 pages.

\* cited by examiner

MEMS AND/OR NEMS DYNAMIC PRESSURE SENSOR WITH IMPROVED PERFORMANCES AND MICROPHONE COMPRISING SUCH A SENSOR

TECHNICAL FIELD AND STATE OF THE PRIOR ART

The present invention relates to a microelectromechanical and/or nanoelectromechanical dynamic pressure sensor with improved performances, and particularly to a microelectromechanical and/or nanoelectromechanical microphone offering improved performances.

Microphones are implemented in a large number of mass consumer applications, such as telephones, touch pads, photo cameras, cameras, etc.), and these applications are in full growth.

Furthermore, certain applications implement several microphones.

The microphones currently the most widely used are electret microphones, but microelectromechanical microphones, or MEMS microphones, where MEMS designates "microelectromechanical system", are tending to replace these electret microphones.

In fact, microelectromechanical microphones attain performances compatible with a good number of applications, are suited to mass production, and have extremely interesting production costs, since the machining of a single wafer of silicon of 200 mm diameter gives several tens of thousands of chips after cutting.

In parallel, it is sought to form microphones of which the required performances are continuously increasing. In fact, new applications require more pass band and/or require lower detection thresholds. This is for example the case of voice recognition or ultrasonic radars.

Moreover, for the aforementioned applications, large miniaturization is desired, for a space saving and/or a cost reduction.

The MEMS microphones currently produced are almost exclusively capacitive detection microphones, described for example in the document A. *Dehe: Silicon microphone development and application, Sensors and Actuators, A: Physical*, A133 (2007), pp. 283-287.

The microphone comprises a flexible membrane that deforms under the effect of the pressure differential between its two faces. A fixed counter-electrode, facing the membrane, forms a variable capacitance capacitor with the membrane. The capacitance varies as a function of the deformation of the membrane, this variation of capacitance being the image of the pressure difference. The membrane deforms in an out-of-plane direction, i.e. perpendicularly to the mean plane of the microphone.

The counter-electrode comprises a multitude of holes. The aim of said holes is to impede as little as possible the circulation of air and the establishment of pressure when the membrane is displaced.

These microphones give satisfaction on the whole but they have certain drawbacks.

The presence of the counter-electrode introduces an acoustic resistance despite the existence of holes, which brings about a thermal noise, and thus a degradation of the detection threshold, as well as a dampening, and thus a reduction in the pass band of the microphone.

To limit these drawbacks, the rear electrode must be perforated as much as possible. The surface of the holes may represent 20% of the surface of the membrane. But the result is a reduction in the facing surfaces, which proportionally reduces the capacitive detection. Thereby the gain in transduction will be reduced and the noise of the electronic part will be less masked, once again leading to a degradation of the detection threshold.

In order to attain higher performances, it is possible to envisage increasing the membrane and counter-electrode surface. But this has the effect of increasing the size of the chip bearing the microphone and its cost.

Moreover, a larger membrane displaces more air when it deforms, this air is going to oppose the displacement of the membrane like a counter spring.

This acoustic stiffness increases with the square of the surface of the membrane.

There exists another type of microphone described in the document FR2963099 in which a sensitive element is displaced in the plane of the microphone. The detection of the displacement of the sensitive element takes place by means of piezoresistive gauges. This microphone does not implement a counter-electrode.

This type of microphone is satisfactory, nevertheless the sensitive element has a small surface, which limits its high performance applications.

DESCRIPTION OF THE INVENTION

It is consequently an aim of the present invention to offer a MEMS and/or NEMS dynamic pressure sensor offering improved performances and a MEMS and/or NEMS microphone offering improved performances.

The aim of the present invention is attained by a dynamic pressure sensor comprising a sensitive element anchored to a support, said element being moveable under the effect of a pressure variation, the sensitive element being rigid and being displaced at least in part in an out-of-plane direction and comprising means of detecting the force applied to the sensitive element by the pressure difference.

Thanks to the invention, on the one hand the drawbacks resulting from the presence of a counter-electrode are eliminated. On the other hand, by forming a sensitive element in the plane, it is possible to form an element offering a large surface.

Moreover, since the element is rigid there is no or little loss of energy in the deformation of the element.

It is then possible to form a microphone which, at given volume, offers improved performances, or at given performances, has a smaller size and a reduced cost price.

The detection means advantageously comprise at least one strain gauge, advantageously selected from a piezoelectric gauge, a piezoresistive gauge and a resonant gauge.

In a particularly advantageous example, the sensitive element comprises a membrane and a rigidification structure is applied on one face of the membrane. Thus the element offers a reduced inertia while at the same time offering the required rigidity.

Advantageously, the sensitive element is anchored by one or more beams forming one or more lever arms and the detection means are coupled to the beam(s). Thus the force seen by the gauge(s) is amplified with respect to that seen by the sensitive element.

In an embodiment, the whole sensitive element is displaced substantially parallel to the support.

In another embodiment, the sensitive element is rotationally articulated with respect to the support around an axis contained in the plane of the sensor.

The subject matter of the present invention is then a dynamic pressure sensor of MEMS and/or NEMS type comprising a support and at least one rigid sensitive element anchored to the support by at least one anchoring zone, said sensitive element comprising parallel first and second faces intended to be subjected to pressures, said sensitive element being capable of having an out-of-plane displacement with respect to the support in a detection direction under the effect of a pressure difference between the first and second faces, the dynamic pressure sensor also comprising means of detecting a force applied to the sensitive element by the pressure difference.

In a preferred manner, the sensitive element comprises a membrane and a rigidification structure secured to the membrane so as to make it rigid.

The rigidification structure may be all or part arranged (formed or transferred) on the membrane. Thus this structure may comprise elements arranged entirely on the membrane and/or elements locally secured to the membrane particularly when said structure comprises at least one element parallel to the membrane and pillars making it possible locally to secure the element to said membrane, said pillars being spread out between said element and the membrane so as to make it possible to make the latter rigid.

The subject-matter of the present invention is also a microphone comprising at least one pressure sensor according to the invention. The sensitive element may advantageously have a rigidity such that the first fundamental mode of deformation of the sensitive element is pushed above the resonance frequency of the microphone, which is itself pushed above the pass band desired for the operation of the microphone.

BRIEF DESCRIPTION OF THE DRAWINGS

The present invention will be better understood on the basis of the description that follows and from the appended drawings in which.

DETAILED DESCRIPTION OF PARTICULAR EMBODIMENTS

The description that follows mainly pertains to a microphone, but it will be understood that the present invention applies more generally to a pressure sensor.

Figures 1, 2B:
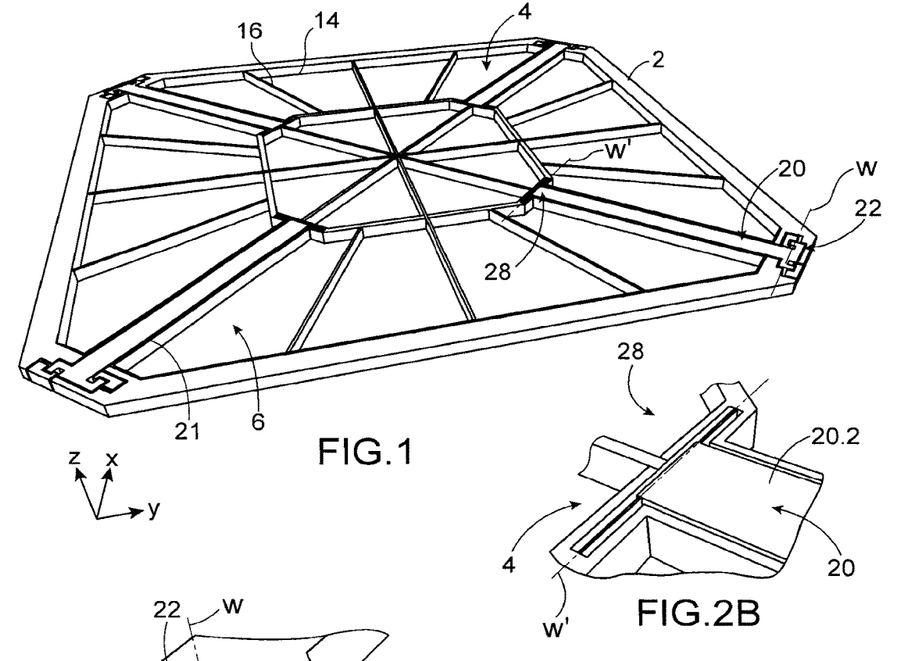
FIG. 1 is a perspective view of an example of formation of a microphone according to a first embodiment.
FIG. 2B is a detail view of FIG. 1 at the level of an articulation between the beam and the sensitive element.

In FIG. 1 may be seen a top perspective view of an example of formation of a MEMS microphone according to a first embodiment with displacement mainly in translation in a direction perpendicular to the plane of the microphone. The microphone comprises a support 2, a sensitive element 4 that moves with respect to the support 2 and means of anchoring 6 the sensitive element 4 to the support 2. The microphone also comprises means of detecting 8 the force applied to the sensitive element by the pressure difference.

The detection means advantageously comprise at least one strain gauge, advantageously selected from a piezoelectric gauge, a piezoresistive gauge and a resonant gauge.

In the example of FIG. 1, detection means of piezoelectric type are considered.

In the present application, "anchoring" is taken to mean the fact of mechanically connecting the sensitive element to the support while at the same time enabling the sensitive element to be displaced with respect to the support along at least one direction useful for detection.

The microphone extends in the plane XY, designated microphone plane, and the sensitive element 4 is capable of being displaced along the direction Z.

Figure 3:
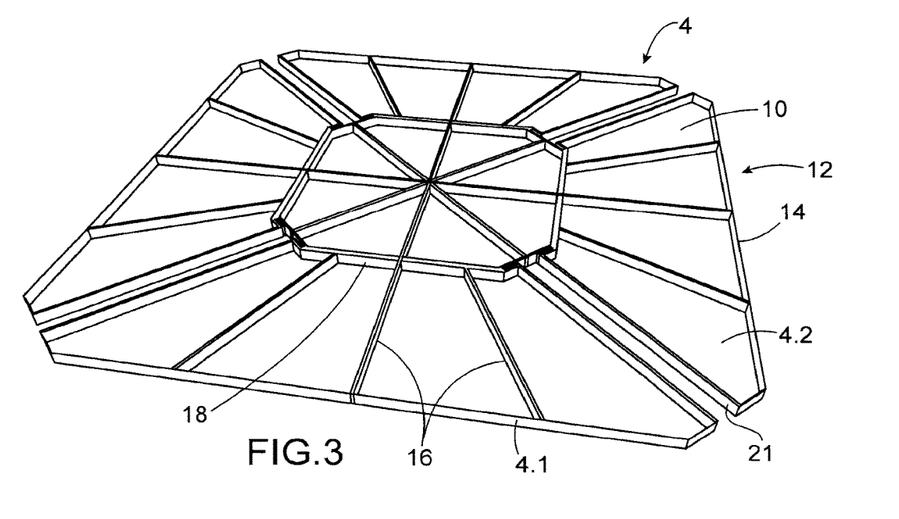
FIG. 3 is a view of the sensitive element of FIG. 1 alone.

The sensitive element comprises a first face 4.1 and a second face 4.2 opposite to the first face 4.1 and extending in the plane XY (FIG. 3).

The pressure difference applies between the first 4.1 and second 4.2 surfaces causing the displacement of the sensitive element along the direction Z.

The sensitive element advantageously has a very large surface, making it possible to recover a maximum signal and to mask at least in part downstream noise.

The sensitive element has a certain rigidity with respect to the pressure differences to which it is subjected.

According to the present invention, "rigid sensitive element" is taken to mean an element of which the deformations in normal conditions of use of the microphone have a negligible effect on detection, that is to say that the energy lost in the deformation of the element is negligible in view of the energy gathered to deform the piezoelectric gauge(s).

To do so, the element is advantageously such that the first fundamental mode of deformation of the element is pushed above the resonance frequency of the microphone and advantageously at least an order of magnitude above the resonance frequency of the microphone, which is itself pushed above the pass band desired for the operation of the microphone.

As an example, for a microphone resonating around 20 kHz, the element is such that the first mode is pushed above 60 kHz, advantageously above 100 kHz, very advantageously above 200 kHz. The rigidity of the sensitive element is determined by the dimensions of the sensitive element and by the material(s) implemented in its formation.

Thus the sensitive element 4 which is rigid according to the invention does not deform or deforms little under the effect of the pressure difference.

In the example represented and in a very advantageous manner, the sensitive element comprises a membrane 10 having for example a thickness of the order of a hundred or so nanometers or of several hundreds of nanometers and means 12 of assuring the rigidification of the membrane. These rigidification means are for example formed by a structure of beams extending on one of the faces of the membrane and crisscrossing the face of the membrane. In the example represented, the membrane has a substantially square shape. The rigidification means comprise beams 14 lining the outer edge of the membrane 10 and thereby forming a frame, beams 16 extending from the centre of the membrane outwards in a substantially radial manner and beams 18 forming an intermediate frame connecting the radial beams 16 together. This configuration of the rigidification means is particularly suited to the arrangement of beams forming lever arm which will be described below.

It will be understood that other structures may be suitable for the rigidification of the membrane.

The beams have for example a thickness of several tens of micrometers, and a width of several hundreds of nanometers to several micrometers.

The sensitive element including a membrane and rigidification means then has the advantage of having a low mass and thus a low inertia, and enables the collection of a large quantity of signal thanks to a large surface.

Alternatively, the sensitive element could be formed by a plate having a thickness such that the sensitive element would have a sufficient rigidity, nevertheless it would offer a greater inertia.

In a very advantageous manner, the sensitive element is freed from the support except at the level of the anchoring means thus it acts substantially like a piston and not like a deformable membrane, energy is then no longer lost in the deformation of the membrane. Moreover, the fact of no longer using the deformation of a membrane to transmit a force makes it possible to use a sensitive element having any shape.

Air flows between the outer edge of the sensitive element and the support. Advantageously, the structuring of the sensitive element is carried out by ionic etching which makes it possible to obtain fine etching over a considerable depth. This fine etching limits the passage of air, increases the associated acoustic resistance, and thus reduces the acoustic noise and the low cut-off frequency of the microphone. In an advantageous manner, the frame forming rigidification beams 14 are arranged flush with the outer edges of the membrane and cooperate with the edge of the support to lengthen the air flow path between the sensitive element and the support, the path then has high acoustic resistance, which even further reduces the acoustic noise and the low cut-off frequency.

In the example represented, the sensitive element is anchored to the support in four anchoring zones situated at the four corners of the sensitive element. The means assuring the anchoring of the sensitive element to the support comprise four beams 20 aligned two by two on the diagonals of the sensitive element and articulated on the intermediate frame and the support 2.

The beams are housed in radial housings 21 made in the sensitive element. The beams 20 are advantageously formed simultaneously with the sensitive element.

The beams are articulated by a longitudinal end 20.1 on the support and by another longitudinal end 20.2 on the membrane. In FIG. 3 may be seen the sensitive element alone without the beams 20.

The rigidification beams 16 lining the housings 21 of the beams 20 are advantageously arranged flush with the membrane surrounding the beams 20 to lengthen the air flow path.

Figure 2A:
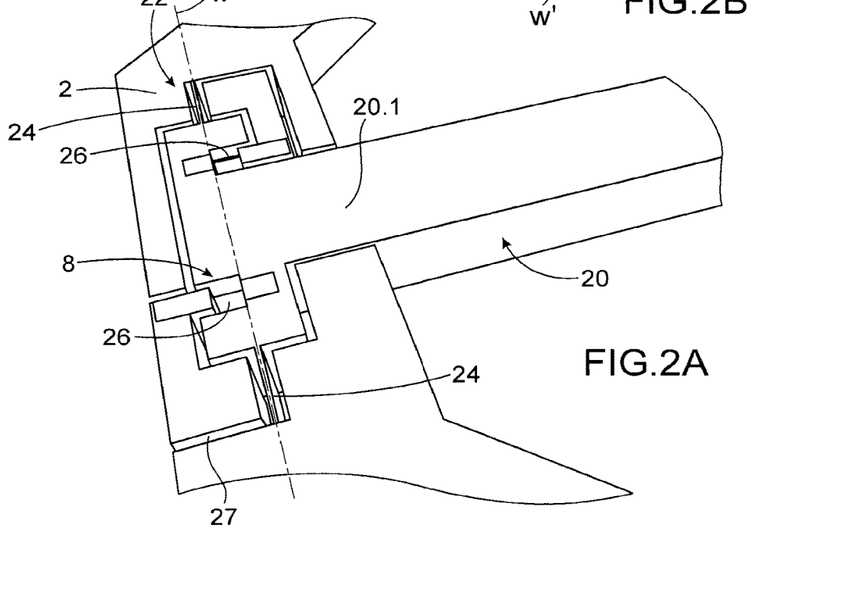
FIG. 2A is a detail view of FIG. 1 at the level of an articulation between the beam and the support, the sensitive element being eliminated.

In FIG. 2A may be seen a detail view of an articulation 22 between the longitudinal end 20.1 of the beam 20 and the support 2. The articulation 22 is a pivot link of axis W parallel to the plane XY of the sensor. In the example represented, the articulation is formed by two strips 24 extending in the direction Z and capable of torsionally deforming around the axis W.

In a very advantageous manner, at least one of the anchoring beams 20 serves for the detection of the pressure difference applied to the sensitive element. In fact it transmits the force between the sensitive element 4 and the piezoresistive detection means 8. In a very advantageous manner, the beam 20 forms a lever arm transmitting the force applied to the sensitive element 4 in an amplified manner to the detection means 8.

In the example represented and in an advantageous manner, the detection means associated with a beam 20 comprise two piezoresistive strain gauges 26 arranged on either side of the beam 20 and are connected for differential measurement. Differential measurement is advantageous in terms of noise, temperature drift and non-linearities. But detection means only implementing a single gauge do not go beyond the scope of the present invention.

Each gauge 26 extends parallel to the beam 20 and is anchored onto the support 2 and onto the beam 20 so as to be off-center with respect to the axis of rotation W and thereby be either compressed, or stretched during the displacement of the beam.

In the example represented, the gauges are anchored onto the support via pads 27 which are etched in the same layer as the support and the arms, they are however electrically insulated from the support by a cut-out 21, in order to enable the reading of the gauges.

In a variant, it is possible to envisage arranging the gauges at the level of the articulation between the beam and the sensitive element in addition to or instead of the gauges 26.

In the case where the sensitive element 4 would have a displacement different to that of the arm 20, the microphone comprises in a very advantageous manner, means transmitting the displacement along the direction Z of the sensitive element 4 to the end of the beam 20.2. These means, advantageously formed by vertical strips 28 (FIG. 2B), connecting the arm to the sensitive element, have considerable stiffness in the direction Z and greater flexibility in transversal directions. In the example represented, the strips extend on either side of the arm with respect to its longitudinal axis and perpendicular thereto. As a variant, means 28 can comprise one strip.

Detection means 8 may be provided at the level of the articulation 22 of a beam, of a part of the beams or of all the beams.

The operation of the microphone of FIG. 1 will now be described.

When a pressure difference is established between the faces 4.1 and 4.2 of the sensitive element 4, a force is applied to the sensitive element along the direction Z upwards or downwards. Each beam 20 then pivots around the axis W transmitting the amplified force to the strain gauges 26 situated at the level of the articulations 22 between the support and the beams. The gauges are then either compressed, or stretched, they then change resistance by piezoresistive effect. The measurement of variation of resistance of the gauges indicates the pressure difference applied to the sensitive element.

Thanks to the invention, practically all the force applied to the sensitive element by the pressure difference between its faces 2.1, 2.2, except for losses due to the stiffness of the articulations, is transmitted to the gauges, since there is no or little loss in the deformation of the sensitive element. Moreover, the sensitive element may have a large surface since it has a reduced inertia, and thereby offers improved performances or, conversely, may have a reduced surface and thus a reduced size, with identical performances.

Figure 4:
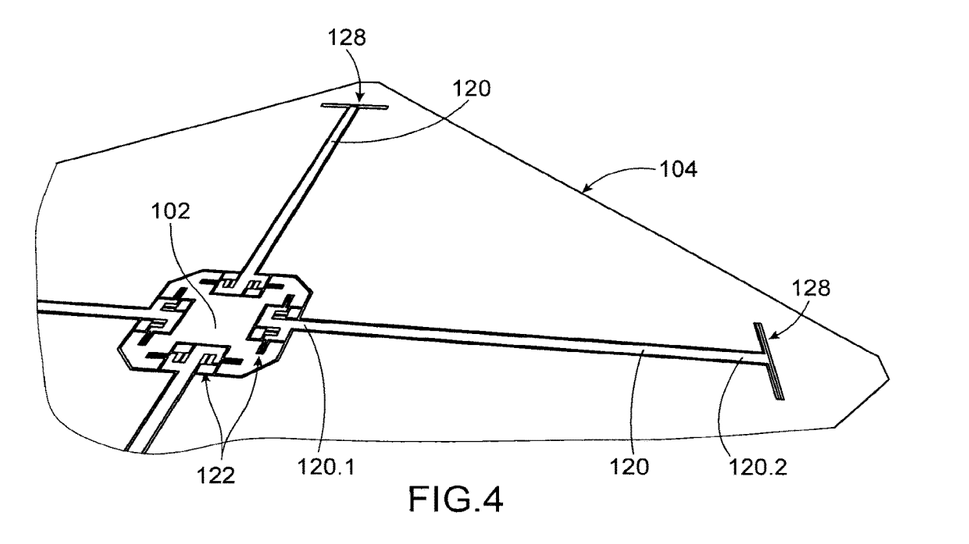
FIG. 4 is a perspective view of another example of formation of a microphone according to a first embodiment.

In FIG. 4 may be seen another example of formation of a microphone according to the first embodiment in which the support 102 is situated at the center of the microphone and the sensitive element 104 surrounds the support 102. The anchoring means 106 are also formed by four beams rotationally articulated by one end 120.1 on the support 102 by articulations 122 and by another end 120.2 on the sensitive element 104 by articulations 128. The articulations 122 and 128 may be identical or similar to the articulations 22 and 28 described above.

The piezoresistive detection means are advantageously provided at the level of the articulation 122 between the support 102 and the beams 120 to benefit from maximum amplification of the force applied to the membrane.

In this representation, the rigidification means have not been represented, but they may have the same structure as that of the rigidification means of FIG. 1.

Figure 5:
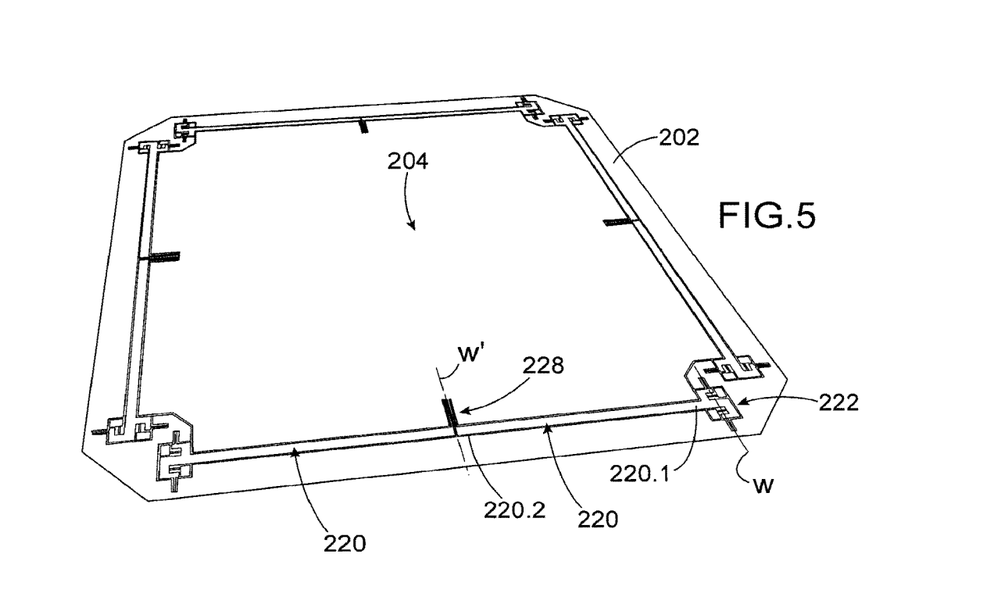
FIG. 5 is a perspective view of another example of formation of a microphone according to a first embodiment.

In FIG. 5 may be seen yet another example of formation according to the first embodiment in which the anchoring beams extend along the edges of the sensitive element. The sensitive element 204 advantageously comprises a membrane and rigidification means (not represented).

The anchoring means comprise eight beams 220 extending by pair parallel to an edge of the sensitive element, each beam 220 of a pair being articulated by a first longitudinal end 220.1 to the support 202 by means of an articulation 222 and by a second longitudinal end 220.2 on the sensitive element 204 by means of an articulation 228.

The articulation 222 between the beam 220 and the support is for example similar to the articulation 22 of the microphone of FIG. 1, the axis of rotation W being perpendicular to the edge of the sensitive element. The articulation 228 between the beam 220 and the sensitive element is for example formed by a strip capable of flexionally deforming and rotating around an axis parallel to the axis W.

In the example represented, each edge is connected to the support by two parallel beams 220 of which the second longitudinal ends 220.1 are facing and are articulated on the sensitive element 204 substantially at the center of the edge of the sensitive element 204.

The strain gauge detection means may be situated at the level of one or more articulations 222.

When the sensitive element is displaced out-of-plane along the direction Z, the two beams 220 connecting an edge to the support have an opposite slope. The implementation of perpendicular beams makes it possible to block translations in the plane XY and rotation around the axis Z.

In a variant, it could then be possible to provide more than two beams per edge or a single beam per edge, it would extend over all or part of the length of the edge of the sensitive element. For example, each beam could connect one end of the edge of the sensitive element to the opposite end of the edge of the support. It may be envisaged in a variant that the beams do not extend over the whole length of the sides. The device would then only comprise four anchoring beams.

Figure 6A:
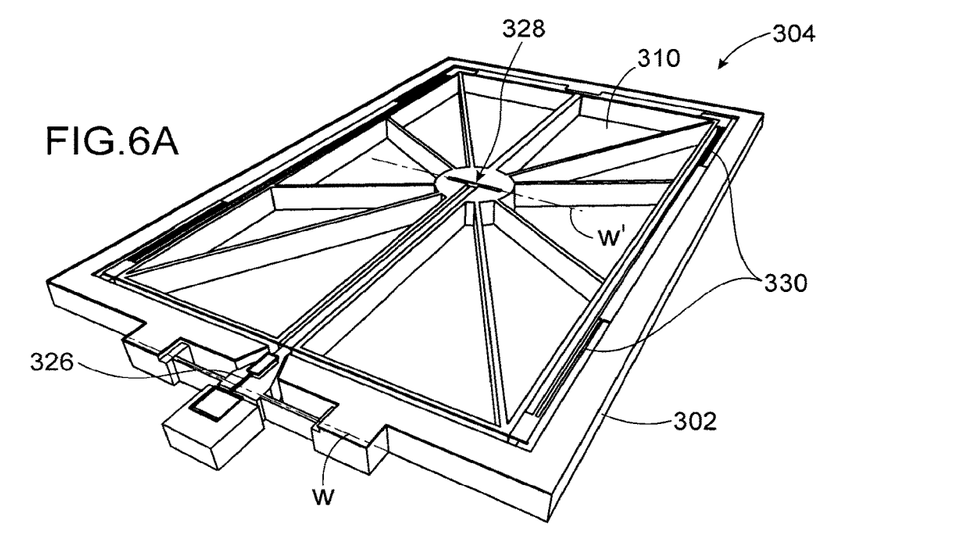
FIGS. 6A and 6B are perspective views from above and below respectively of another example of formation of a microphone according to a first embodiment comprising a single beam forming a lever arm.
Figure 6B:
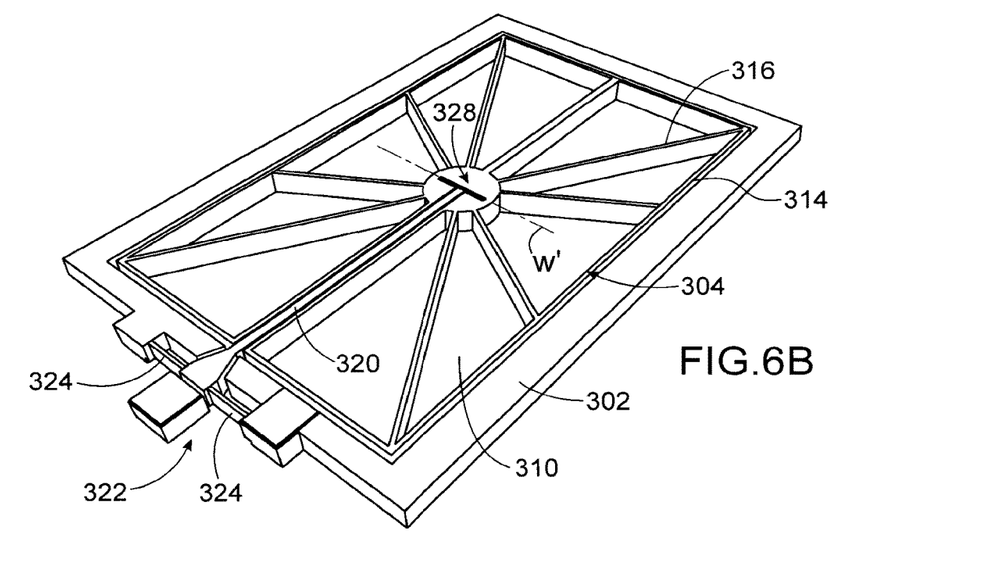

In FIGS. 6A and 6B may be seen another example of formation of a microphone according to the first embodiment, seen from above and below respectively. The anchoring means comprise a sensitive element 304 including a membrane and rigidification means transparently represented through the membrane. The rigidification means comprise a frame 314 delimiting the outer edges of the sensitive element and beams 316 arranged radially from the center of the sensitive element 304.

The microphone also comprises anchoring means which include a beam 320 articulated on an edge of the support 302 and on the rigidification means. The anchoring means also comprise additional means to limit the displacement of the sensitive element in translation in the plane and rotation around Z since the beam 320 alone cannot limit these movements.

In this example and in a very advantageous manner, the membrane 310 is partially cut-out, i.e. the membrane is still connected in certain zones to the support by portions 330 of membrane 310 connecting the sensitive element to the support. In the example represented, portions 330 extend parallel to the edges of the sensitive element. The dimensions and arrangements of the portions 330 are such that they limit, or even prohibit, undesired movements of the sensitive element, i.e. translations in the plane of the sensitive element and rotation around the axis Z. These portions have on the other hand negligible stiffness in the direction Z in view of that of the detection gauge(s), thereby the useful movement serving for detection is not hindered. These elements may be formed by nanowires of several hundred nanometers width, a microband of several tens of micrometers width or any other intermediate device.

In a similar manner to the examples already described, the articulation 322 between the beam and the support comprises torsionally deformable strips 324, similar to those of the articulation 22, and the articulation 328 between the beam 320 and the support 302 may be identical to the articulation 28.

In this example, the detection means comprise a single gauge 326 aligned with the axis of the beam and suspended between the beam and the support. The gauge is off-center with respect to the axis of rotation W so as to be stretched or compressed during the displacement of the beam. Several gauges could be implemented.

This example is particularly advantageous on account of its simple structure.

Figure 7:
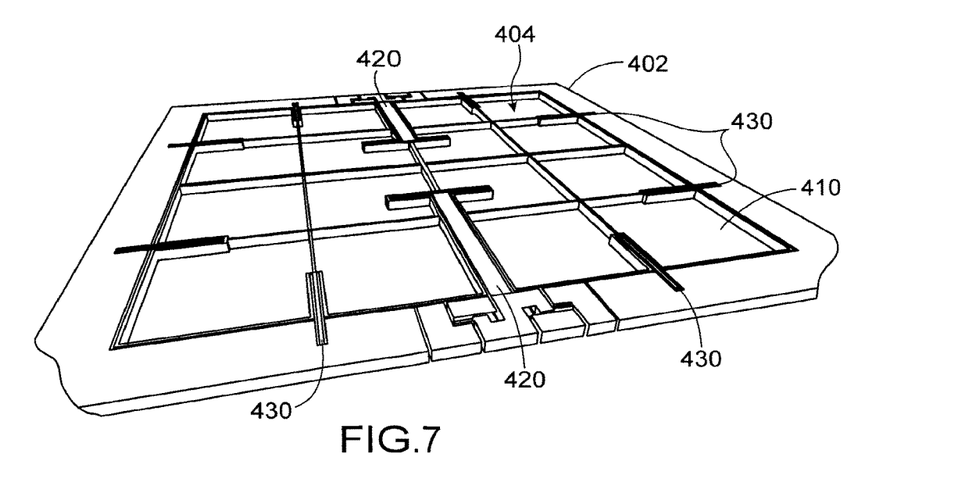
FIG. 7 is a perspective view of a variant of the microphone of FIGS. 6A and 6B.

In FIG. 7 may be seen a variant of the device of FIGS. 6A and 6B, this differs from the device of FIGS. 6A and 6B in that it comprises two anchoring beams 420 aligned with each other and each articulated on an edge opposite from the support 402.

Means for limiting non-useful displacements of the sensitive element are also advantageously provided, they may be formed by portions of membranes. In the example represented, the portions 430 extend perpendicularly to the edges of the sensitive element 404 and to the edges of the support 402. For example, they are two in number per edge. They have a negligible stiffness in the out-of-plane direction and do not enter into competition with the detection gauge(s). The number and the dimensions of the portions of membrane between the support and the sensitive element are chosen so as not to hinder the displacement of the sensitive element in the detection direction.

In FIG. 7, the sensitive element comprises a membrane 410 and rigidification means formed of beams intersecting at right angle so as to form a crisscross pattern.

Figures 8A, 8B, 9:
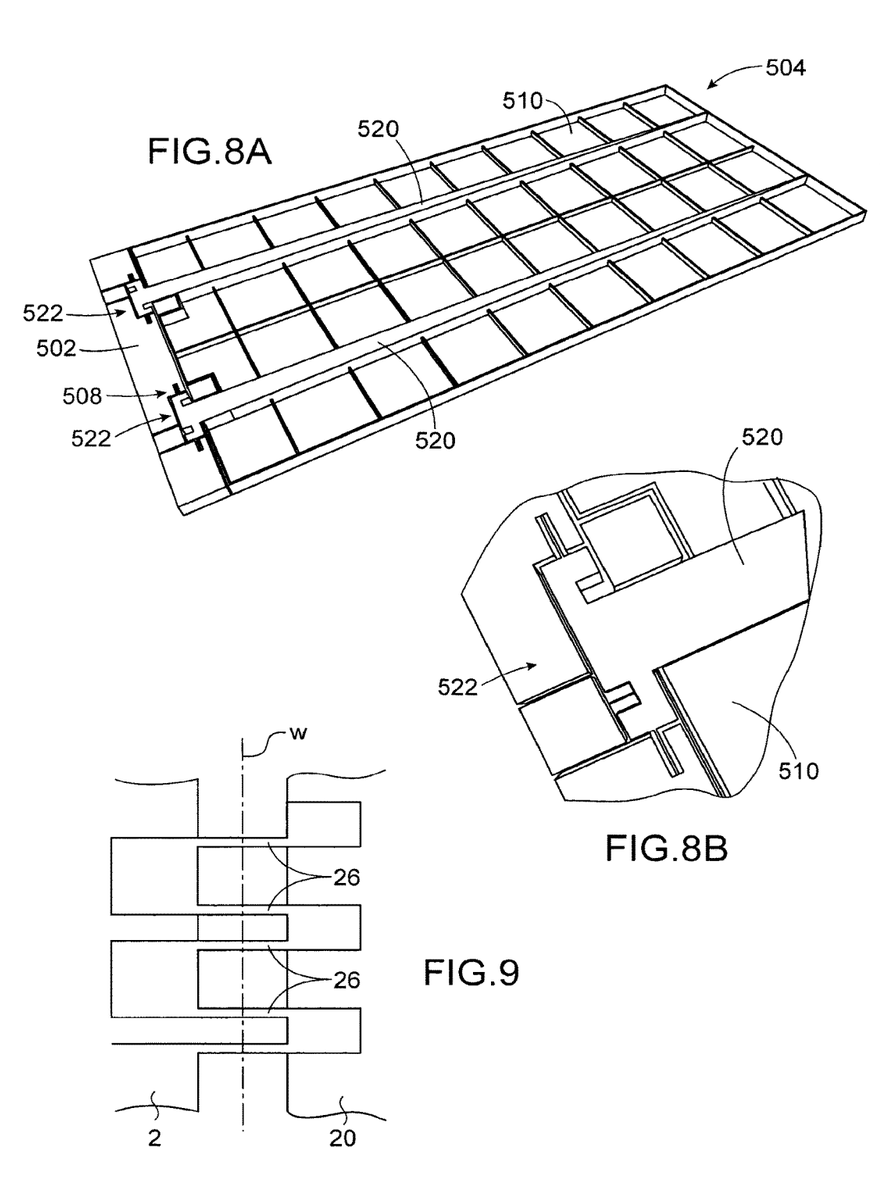
FIG. 8A is a perspective view of an example of formation of a microphone according to a second embodiment.
FIG. 8B is a detail view of FIG. 8A at the level of an articulation.
FIG. 9 is a schematic representation of an advantageous example of strain gauge detection means being able to be implemented in a microphone according to the invention.

In FIGS. 8A and 8B may be seen an example of formation of a device according to the second embodiment, which differs from the first embodiment in that the sensitive element has a displacement mainly in rotation around an axis parallel to the plane and not substantially parallel to the plane of the microphone along the axis Z.

The microphone comprises a sensitive element 504 rotationally articulated with respect to a support 502 by an edge. In the example represented, the sensitive element 504 has a rectangular shape. In the example represented, the microphone comprises two beams and two articulations 522 of axis of rotation W parallel to the plane XY through which the sensitive element is anchored to the support.

The articulations 522 are similar to the articulations 22 described above.

In a very advantageous manner, the beams 520 are of one piece with the rigidification means and thus form part of the rigidification means, which simplifies the manufacturing method.

In the example represented, the sensitive element comprises a membrane 510 and rigidification means.

The microphone also comprises detection means 508 similar to those described above, they comprise one or more strain gauges off-center with respect to the axis of rotation W of the sensitive element with respect to the support. Thanks to the lever arm, the force applied to the sensitive element by the pressure difference is amplified and applies on the strain gauges.

The forces seen by the strain gauges are all the greater the closer the gauges are to the axis of rotation in considering the direction Z.

In the example represented, the beams have a variable section, more particularly a section which decreases on moving away from the articulations 522. The inertia of the sensitive element is thereby reduced. The operation of the microphone of FIGS. 8A and 8B will now be described.

When a pressure difference is applied between the two faces of the sensitive element 504, a force applies on the sensitive element which causes its rotation around the axis W upwards or downwards along the direction of the force.

The force applied to the sensitive element is transmitted to the gauges situated at the level of the articulations 522, this is amplified thanks to the lever arm effect. The gauges are then compressed or stretched, they then change resistance by piezoresistive effect. The measurement of the variation of resistance of the gauges indicates the pressure difference applied to the sensitive element. The sensitive element then has an out-of-plane movement but this is not parallel to the plane of the sensitive element.

A microphone only comprising a single articulation 522 and thus a single beam and a microphone with more than two beams 520 and more than two articulations 522 do not go beyond the scope of the present invention.

The gauges may have any shape. Their shapes and their dimensions are nevertheless preferably chosen to reduce Flicker noise, to take account of buckling constraints and to have suitable resistance.

In FIG. 9 may be seen a particularly advantageous formation of the detection means comprising a plurality of gauges 26 arranged parallel to each other for example at the level of the articulation(s) between the beam 20 and the support 2 and electrically connected in series. It is provided to electrically insulate the gauges from the beam(s) and/or the rigidification means. This may be easily done thanks to the oxide layer of an SOI ("silicon on insulator") substrate enabling mechanical strength without electrical contact. In a variant, it is also possible to use doping to assure electrical insulation by PN diode: the gauge would then be P doped and surrounded by an N doped insulating wall, to separate it from the remainder of the layer, P doped. A reverse doping may be used.

By implementing a large number of gauges, the electrical resistance is increased and the number of carriers is increased. Moreover, shorter gauges capable of withstanding buckling may be formed.

In the example of FIG. 9, the gauges are advantageously made of one piece by etching.

In all the examples, the detection means could be selected from piezoelectric detection means, piezoresistive detection means and resonant gauge detection means.

An example of a method for manufacturing a microphone according to the invention will now be described with the help of FIGS. 10A to 10L.

This example of method uses a semiconductor substrate 600, for example made of silicon, but a substrate made of another non-semiconductor material such as glass, quartz, etc. could be used.

Figure 10A:
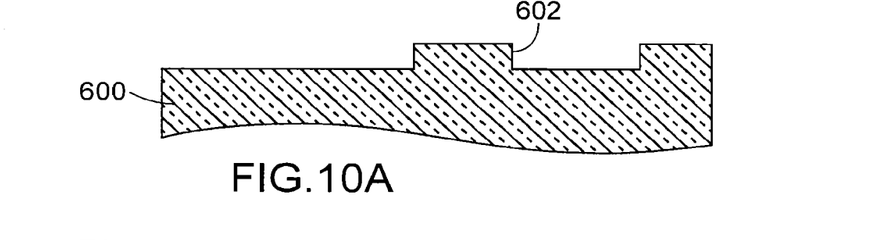
FIGS. 10A to 10L are schematic representations of different steps of an example of method of formation of a microphone according to the invention.

During a first step, a photolithography then an etching are carried out, for example by reactive ions, to form a recess 602 in one face of the substrate 600, as well as pillars intended to support the fixed parts of the MEMS.

Advantageously, the etching takes place over a thickness of several microns.

The element thereby formed is represented in FIG. 10A.

Figure 10B:
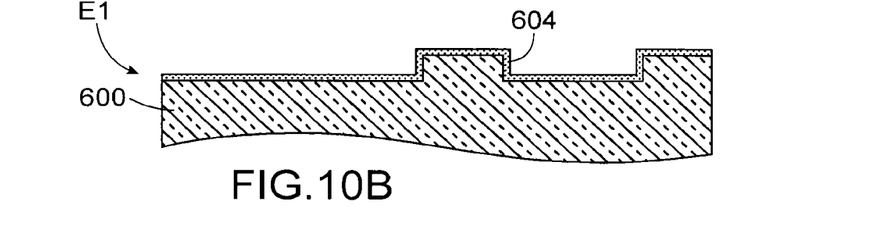

During a following step, an oxide layer 604 is formed on the etched face of the substrate 600, for example by thermal oxidation or by deposition, this oxide layer 604 is intended to form a stop layer for the final etching. Advantageously, the thickness of the layer 604 is of the order of a µm.

The element E1 thereby formed is represented in FIG. 10B. The element E1 is intended to form a base for the microphone.

Figure 10C:
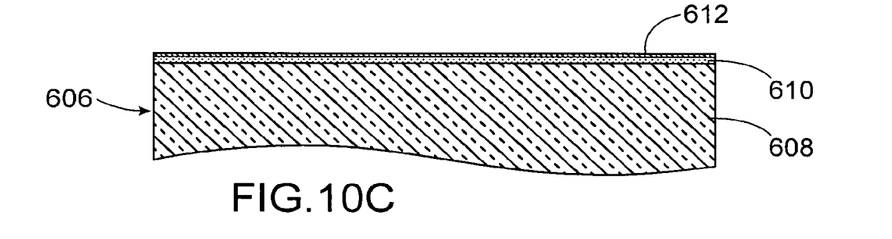

During a following step, a SOI substrate 606 represented in FIG. 10C is used. A SOI substrate comprises bulk silicon 608, an oxide layer 610 and a silicon layer 612 on the front face. The oxide layer 610 advantageously has a thickness of several microns.

The gauge(s) and the membrane will be formed in the layer 612, its thickness will thus determine the thickness of the gauges and the membrane. The thickness of the layer 612 is advantageously several hundreds of nanometers.

The element thereby formed is represented in FIG. 10C.

Figure 10D:
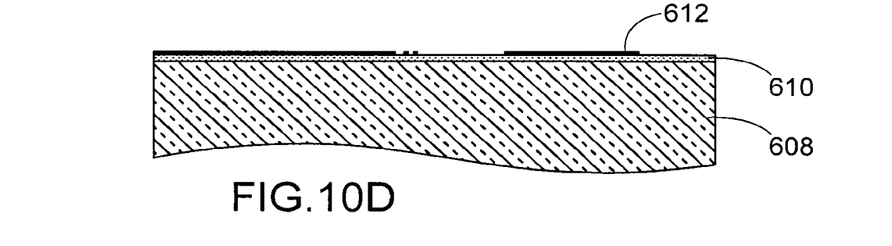

During a following step, a photolithography then an etching are carried out, for example by reactive ion etching, to define the gauges, their connections and the membrane in the layer 612

The element thereby formed is represented in FIG. 10D.

Figure 10E:
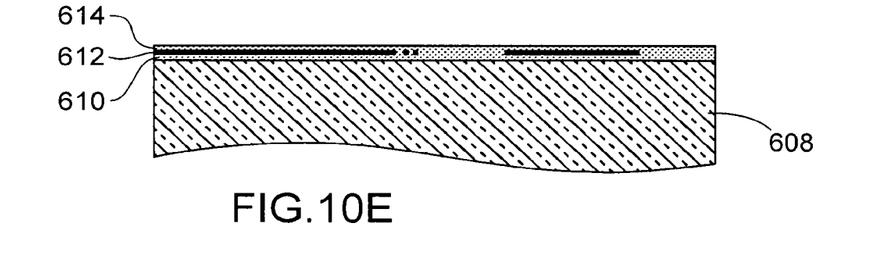

During a following step, an oxide layer 614 is formed for example by deposition, its thickness is sufficient to embed the layer of etched silicon 612.

A step of planarization, for example by chemical-mechanical polishing, may then take place.

The element thereby formed is represented in FIG. 10E.

Figure 10F:
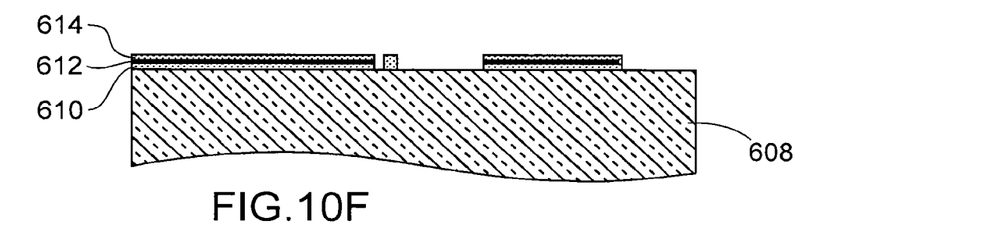

During a following step, a photolithography then an etching are carried out, for example by reactive ions, of the layers 614 and 610 with stoppage on the substrate 608.

The element thereby formed is represented in FIG. 10F.

Figure 10G:
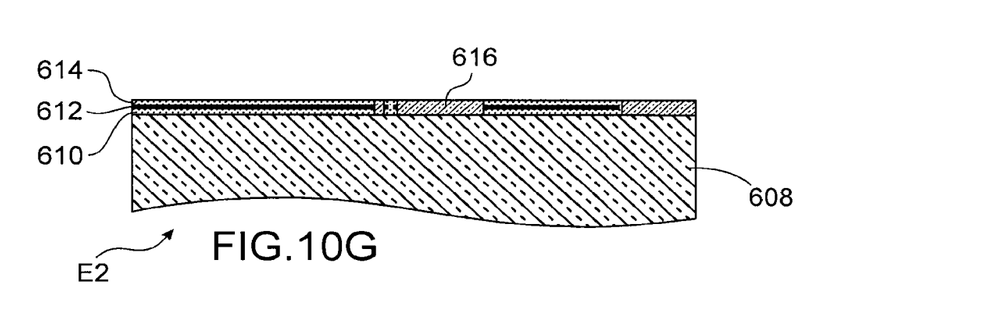

During a following step, a layer of semiconductor 616, for example of silicon, is formed. Then a step of planarization for example by polishing takes place such that the layer 616 fills the etchings of the preceding step and is flush with the layer 614.

The element E2 thereby formed is represented in FIG. 10G. The element E2 forms a MEMS (microelectromechanical system) element.

Figure 10H:
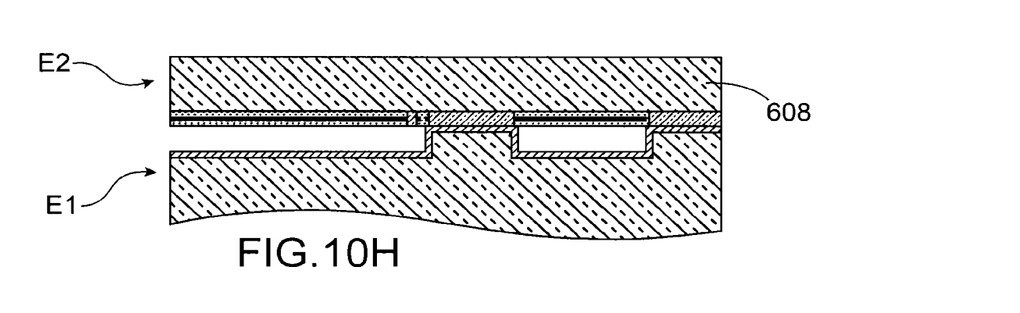

During a following step, the elements E1 and E2 are assembled. To do so, the element E2 is turned over, the two elements E1 and E2 are aligned and a transfer of the element E2 is made onto the element E1 or base.

The assembly takes place for example by direct bonding.

The base may then be thinned as well as the substrate 608 by grinding, followed by polishing.

For example, after thinning the element E2 has a thickness of several tens of µm and the base has a thickness of several hundreds of µm to assure rigidity.

The element thereby formed is represented in FIG. 10H.

Figure 10I:
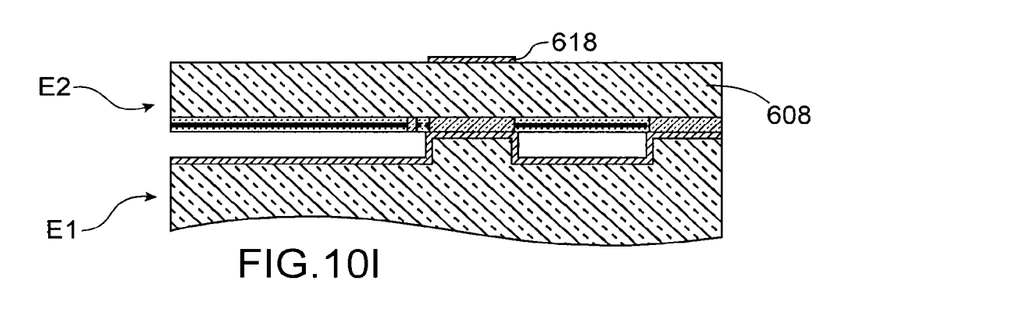

During a following step, a layer of metal 618, for example of gold, is formed for example by deposition, on the free face of the element E2, for example having a thickness of several hundreds of nanometers, to form the contact pick up on the pads or for the bonding of a lid. A step of photolithography then of etching, for example by reactive ions, takes place to eliminate the non-useful portions of the layer 618.

The element thereby formed is represented in FIG. 10I.

Figure 10J:
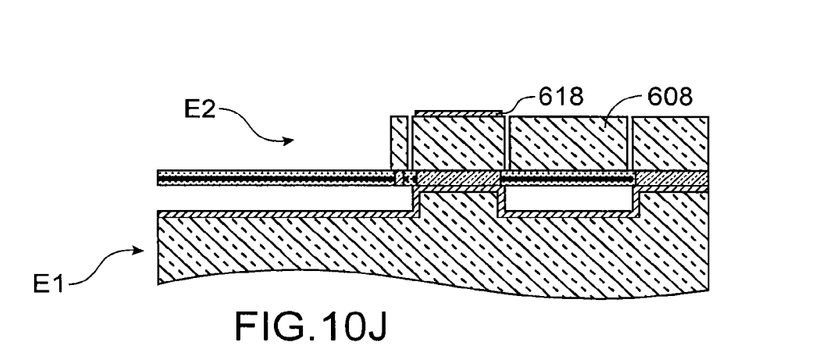

During a following step, a photolithography then an etching are then carried out, for example a deep reactive ion etching, of the element E2 to form the rigidification means, the beam(s) forming lever arm, contact pad(s).

The element thereby formed is represented in FIG. 10J.

Figure 10K:
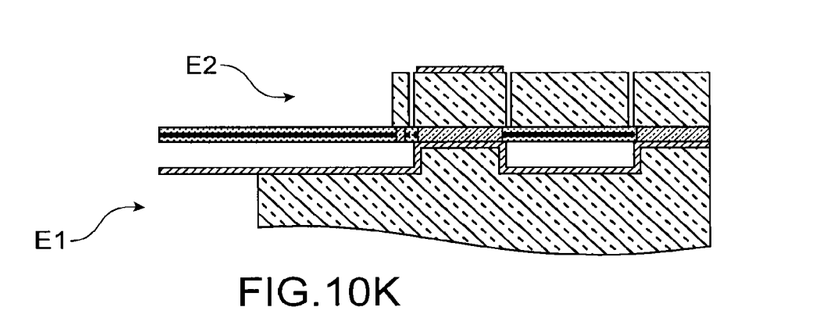

During a following step, a photolithography then an etching are carried out, for example a deep reactive ion etching, of the base in order to form the opening to the exterior enabling acoustic pressure to access the sensitive element.

The element thereby formed is represented in FIG. 10K.

Figure 10L:
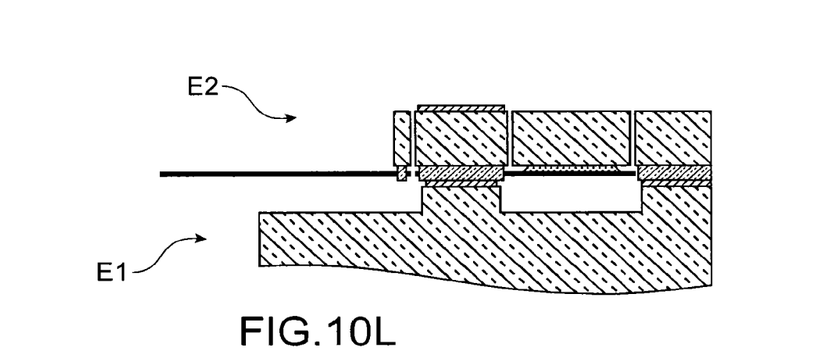

During a following step, the gauges and the sensitive element 4 are released by immersion in a HF bath, or by HF in vapor phase.

The rigidification means 12 of the sensitive element 4 line the edge of the sensitive element.

The microphone thereby formed is represented in FIG. 10L.

A lid may be added on the side of the sensitive element.

Advantageously, it is possible to provide to form abutments to limit the displacement of the sensitive element and excessive loading of the gauges in the event of a very strong signal. These abutments are for example formed directly between the outer edges of the sensitive element and the element E1, they are configured to be arranged with respect to each other to limit movement in the two senses in the direction Z. The distance between the sensitive element and the element E1 is defined by the thickness of the layer 610. At the level of the abutments, the sensitive element cannot be displaced more than the thickness of the oxide 610.

According to another example, a method similar to that described in the document EP2541222 is used. A single substrate is implemented with a growth by epitaxy of semi-conductor. To do so, a SOI substrate is used of which the bulk 608 forms the base, the layer 612 will be treated according to the same steps as described above. The oxide layer 610 fulfils the function of the layer 604, and enables after liberation the formation of cavities like those formed at step 10B.

Then to form the rigidification means, the beam(s) and the contact pad(s), an epitaxy of several tens of μm is carried out on the layer containing the gauges.

Thanks to the invention, it is thus possible to form high performance microphones, and to reduce the cost of current microphones, particularly by reducing their size.

The invention claimed is:

1. A dynamic pressure sensor of MEMS and/or NEMS type comprising:
    a support;
    at least one rigid sensitive element anchored to the support at a level of at least one anchoring zone, said sensitive element comprising parallel first and second faces to be subjected to pressures, said sensitive element having an out-of-plane displacement with respect to the support in a detection direction under an effect of a pressure difference between the first and second faces;
    an anchoring device for anchoring the sensitive element to the support, said anchoring device comprising at least one beam rotationally articulated on the support by an articulation of which the axis of rotation is parallel to a plane of the sensor; and
    a force detector for detecting a force applied to the sensitive element by the pressure difference.

2. The dynamic pressure sensor according to claim 1, wherein the sensitive element comprises a membrane and a rigidification structure secured to the membrane so as to make it rigid.

3. The dynamic pressure sensor according to claim 2, wherein the membrane has a thickness from several tens of nanometers to several hundreds of nanometers, and the rigidification structure has a thickness from several micrometers to several tens of micrometers.

4. The dynamic pressure sensor according to claim 1, wherein the at least one beam is fixed onto the sensitive element such that the sensitive element is rotationally displaced with respect to the support around said axis of rotation.

5. The dynamic pressure sensor according to claim 4, wherein said anchoring device comprises several beams parallel to each other.

6. The dynamic pressure sensor according to claim 2, wherein the at least one beam is fixed onto the sensitive element such that the sensitive element is rotationally displaced with respect to the support around said axis of rotation, and wherein the at least one beam also forms at least one part of the rigidification structure.

7. The dynamic pressure sensor according to claim 1, wherein the at least one beam is moreover rotationally and translationally articulated on the sensitive element by an additional articulation of which the axis of rotation and the axis of translation are parallel to the plane of the sensor.

8. The dynamic pressure sensor according to claim 7, wherein the additional articulation comprises at least one strip perpendicular to the axis of the beam and to a plane of the sensor.

9. The dynamic pressure sensor according to claim 7, wherein the anchoring device comprises several beams arranged so as to limit movements of the sensitive element in directions different from the detection direction.

10. The dynamic pressure sensor according to claim 1, wherein the detector comprises at least one strain gauge.

11. The dynamic pressure sensor according to claim 10, wherein the at least one strain gauge is selected from a piezoelectric gauge, a piezoresistive gauge and a resonant gauge.

12. The dynamic pressure sensor according to claim 1, wherein the detector comprises an assembly including at least one gauge situated at a level of the articulation between at least one beam and the support and suspended between the beam and the support, the gauge being shifted along a direction perpendicular to the plane, with respect to the axis of rotation.

13. The dynamic pressure sensor according to claim 12, wherein the detector comprises two assemblies of at least one gauge, said assemblies being mounted differentially.

14. The dynamic pressure sensor according to claim 11, wherein the assembly comprises several gauges arranged parallel to each other and electrically connected in series.

15. The dynamic pressure sensor according to claim 1, further comprising a blocking device configured to at least limit movements of the sensitive element in directions different from the detection direction.

16. The dynamic pressure sensor according to claim 15, wherein the sensitive element comprises a membrane and a rigidification structure secured to the membrane so as to make it rigid, and wherein the membrane is attached in distinct zones to the support by elements offering considerable rigidity in directions other than the detection direction.

17. The dynamic pressure sensor according to claim 16, wherein the elements for attaching the membrane to the support in distinct zones are of one piece with the membrane and have a transversal dimension of several hundreds of nm.

18. The dynamic pressure sensor according to claim 15, wherein the rigidification structure comprises beams spread out on the membrane.

19. The dynamic pressure sensor according to claim 2, wherein the rigidification structure comprises beams arranged flush with edges of the membrane.

20. The dynamic pressure sensor according to claim 1, wherein the sensitive element is separated at least in part from the support by etching.

21. A microphone comprising:
a pressure sensor that includes
  a support,
  at least one rigid sensitive element anchored to the support at a level of at least one anchoring zone, said sensitive element comprising parallel first and second faces to be subjected to pressures, said sensitive element having an out-of-plane displacement with respect to the support in a detection direction under an effect of a pressure difference between the first and second faces,
  an anchoring device for anchoring the sensitive element to the support, said anchoring device comprising at least one beam rotationally articulated on the support by an articulation of which the axis of rotation is parallel to a plane of the sensor, and
  a force detector for detecting a force applied to the sensitive element by the pressure difference.

22. The microphone according to claim 21, wherein the sensitive element has a rigidity such that the first fundamental mode of deformation of the sensitive element is pushed above a resonance frequency of the microphone, which is itself pushed above a pass band desired for operation of the microphone.

23. The dynamic pressure sensor according to claim 3, wherein the membrane has a thickness from 100 nanometers to 500 nanometers, and the rigidification structure has a thickness from 5 μm to 30 μm.

* * * * *